United States Patent
Fitzgerald et al.

(10) Patent No.: US 10,876,914 B2
(45) Date of Patent: Dec. 29, 2020

(54) SYSTEMS AND METHODS FOR DETECTION OF MOBILE DEVICE FAULT CONDITIONS

(71) Applicant: BLANCCO TECHNOLOGY GROUP IP OY, Joensuu (FI)

(72) Inventors: William Fitzgerald, Cork (IE); Donal O'Shaughnessy, Cork (IE); Donie Kelly, Cork (IE)

(73) Assignee: BLANCCO TECHNOLOGY GROUP IP OY, Joensuu (FI)

(*) Notice: Subject to any disclaimer, the term of this patent is extended or adjusted under 35 U.S.C. 154(b) by 149 days.

(21) Appl. No.: 15/582,471

(22) Filed: Apr. 28, 2017

(65) Prior Publication Data

US 2017/0315007 A1    Nov. 2, 2017

Related U.S. Application Data

(60) Provisional application No. 62/329,159, filed on Apr. 28, 2016.

(51) Int. Cl.
| | |
|---|---|
| *G01L 5/22* | (2006.01) |
| *G06F 11/22* | (2006.01) |
| *G06F 3/041* | (2006.01) |
| *G06F 11/277* | (2006.01) |
| *G06F 11/263* | (2006.01) |

(52) U.S. Cl.
CPC .............. *G01L 5/22* (2013.01); *G06F 3/0418* (2013.01); *G06F 11/2221* (2013.01); *G06F 3/041* (2013.01); *G06F 3/0414* (2013.01); *G06F 3/04142* (2019.05); *G06F 3/04144* (2019.05); *G06F 11/263* (2013.01); *G06F 11/277* (2013.01)

(58) Field of Classification Search
None
See application file for complete search history.

(56) References Cited

U.S. PATENT DOCUMENTS

| | | |
|---|---|---|
| 8,867,817 B1 | 10/2014 | Cooper et al. |
| 8,964,062 B1 | 2/2015 | Neglur |
| 9,134,892 B2 * | 9/2015 | Hicks .................. G06F 3/04883 |
| 2006/0007177 A1 | 1/2006 | McLintock |

(Continued)

OTHER PUBLICATIONS

Bian Xiao et al., Multiscale Fully Convolutional Network with Application to Industrial Inspection, 2016 IEEE Winter Conference on Applications of Computer Vision (WACV), IEEE, Mar. 7, 2016 (Mar. 7, 2016), pp. 1-8.

(Continued)

*Primary Examiner* — John C Kuan
(74) *Attorney, Agent, or Firm* — Dickinson Wright PLLC

(57) ABSTRACT

There is presented a system and method for detecting mobile device fault conditions, including detecting fault conditions by software operating on the mobile device. In one embodiment, the present invention provides for systems and methods for detecting that a mobile device has a cracked screen, and reporting the status of the screen, working or not, so that appropriate action may be taken by a third party. In one embodiment, the data obtained by testing of the mobile device is encrypted to prevent tampering or spoofing by the user of the mobile device, and is suitably decrypted by the recipient or software running within a server.

12 Claims, 13 Drawing Sheets

(56) References Cited

U.S. PATENT DOCUMENTS

| | | | | |
|---|---|---|---|---|
| 2013/0162548 | A1* | 6/2013 | Chen | G06F 3/0418 |
| | | | | 345/173 |
| 2014/0313144 | A1* | 10/2014 | Seto | G06F 3/041 |
| | | | | 345/173 |
| 2015/0206200 | A1* | 7/2015 | Edmondson | G06Q 30/0278 |
| | | | | 705/306 |
| 2015/0339736 | A1 | 11/2015 | Bennett | |
| 2016/0225036 | A1 | 8/2016 | Nugyen | |
| 2017/0023637 | A1* | 1/2017 | Yang | G06F 3/041 |
| 2017/0195069 | A1* | 7/2017 | Slavin | H04B 17/17 |

OTHER PUBLICATIONS

Yuan Lunxi et al., The Development and Prospect of Surface Defect Detection Based on Vision Measurement Method, 2016 12th World Congress on Intelligent Control and Automation (WCICA), IEEE, Jun. 12, 2016 (Jun. 12, 2016), pp. 1382-1387.

Zhang Lei et al., Road Crack Detection Using Deep Convolutional Neural Network, 2016IEEE International Conference on Image Processing (ICIP), IEEE, Sep. 25, 2016 (Sep. 25, 2016), pp. 3708-3712.

Notification of Transmittal of the International Search Report and the Written Opinion of the International Searching Authority, dated May 2, 2018, by the European Patent Office / Searching Authority, for related international application PCT/US2018/019380.

International Search Report and Written Opinion dated Sep. 20, 2017 issued by the European Patent Office on related international application PCT/US2017/030288.

* cited by examiner

SYSTEMS AND METHODS FOR DETECTION OF MOBILE DEVICE FAULT CONDITIONS

CROSS REFERENCE TO RELATED APPLICATIONS

This application claims full benefit of and priority to U.S. Provisional Patent Application No. 62/329,159 filed Apr. 28, 2016 titled, "SYSTEM AND METHOD FOR DETECTION OF MOBILE DEVICE FAULT CONDITIONS," the disclosure of which is fully incorporated herein by reference for all purposes.

FIELD AND BACKGROUND OF THE INVENTION

Field of the Invention

The present invention relates to systems and methods for detecting fault conditions in mobile devices. More particularly, the present invention provides for systems and methods for detecting a that a mobile device has a cracked screen, and reporting the status of the screen, working or not, so that appropriate action may be taken by a third party.

BACKGROUND OF THE INVENTION

Today, the use of mobile electronic devices is widespread, and increasing numbers of people utilize such devices in their daily lives. Examples of such devices include cellular phones, smart watches, portable digital assistants (PDAs), digital cameras, intelligent devices for the "Internet of things," and laptop computers. As the growth of use of mobile devices has increased, so has the need to provide insurance and cost-effective warranty coverage for such devices. Importantly, smart mobile devices can increase a user's productivity and quality of life, but they are susceptible to damage from a variety of sources, such as water damage, shock damage, and other forms of unexpected use or misuse. It is well known that the displays on mobile devices (also interchangeably identified as "screens" herein), while constructed of more durable or tougher substances such as advanced forms of glass, are still susceptible to fracture or breakage. When a user's mobile device becomes damaged, warranty replacement or insurance coverage are often sought by the owner of a damaged device to obtain a working model.

One problem plaguing this industry is fraud. An industry has grown around the filing of fraudulent claims for allegedly lost or stolen mobile devices. This problem is further compounded with a growing need for insurance on the secondary mobile device market, where devices are more likely to have a fault condition present. Countless dollars are lost each year as a result of fraudulent claims. For example, a user of a mobile device may drop or misuse the device and crack the display/screen, then attempt to apply for third party damage insurance after the incident in an attempt to obtain a replacement model. Also, some unscrupulous persons may claim that a device that was purchased was received by post in a damaged condition, when the person actually damaged the device themselves. Further, a fraudulent seller may present a picture to a customer on websites such as EBay showing a perfectly good phone, then selling a faulty device (such as with a cracked display). Even worse, collusion may occur between a mobile device owner and a "repair" facility where an insured device is claimed damaged, and the repair facility splits the insurance fees with the customer for fraudulently claiming devices required repair when they in fact were not faulty.

Current systems and methods employed to check the veracity of such claims are not particularly sophisticated or successful in detecting and deterring fraud, because it is difficult or impossible by current methods for a third party to remotely assess the condition of a mobile device and determine whether a warranty or insurance claim is valid. Further, prior methods that require the mobile device user to take a picture of the mobile device in a mirror using the mobile device's front-facing camera can be spoofed, even when a QR code with an encoded IMEI of the phone is shown on the display (which also presupposes the display is sufficiently functional to display this image, and further, small or minor cracks may not even be apparent in the mirror image). Therefore, there is a need for systems and methods that overcome these and other problems associated with the prior art. Moreover, there is a more general need to provide for systems and methods to determine that a fault condition exists (or not) in a mobile device, and allow such information to be reported to a third party entity.

SUMMARY OF THE INVENTION

The following technical disclosure is exemplary and explanatory only and is not necessarily restrictive of the invention as claimed.

As used herein, the term "mobile device," "mobile electronic device," or "device" generally refers to any electronic device capable of being moved from place to place, and has components (such as displays or screens) that can become faulty or damaged. A mobile device may be a stand-alone device such as a laptop computer, a desktop computer, a mobile subscriber communication device, a mobile phone, a personal digital assistant (PDA), a data tablet, a digital camera, a video camera, a video game console, a media player, a global positioning system (GPS), Universal Serial Bus (USB) keys, mobile weapons, smart watches or jewelry, embedded electronics, and combinations thereof. A mobile electronic device may also be any electronic device integrated with another system or device. For example, a stereo, global positioning system, or other electronic device contained within a vehicle may be utilized in concert with the present invention. Software to implement methods of the present invention can be (1) installed on, or (2) downloaded onto a mobile device indirectly or directly at any time by an authorized user through the Internet, SMS text message, through wireless communication with an app provisioning store, or in any other suitable manner and at any suitable time for carrying out a method according to the invention. For example, the software may be installed on the device when purchased or downloaded after the device is purchased, or even after the device damaged or otherwise becomes faulty. The mobile device may be insured against loss or theft, and systems and methods of the present invention may operate as part of, or in addition to, an insurance policy on the mobile device.

There is presented a system and method for detecting mobile device fault conditions, including detecting fault conditions by software operating on the mobile device. A user that has a mobile device with an alleged fault condition (such as a cracked screen/display) may be requested to install an application (such as the Fault State Test Application referred to above) on the allegedly faulty mobile device. The FSTA provides a trusted method to assess the veracity of a claimed fault condition on the mobile device (such as a cracked or damaged screen/display). The FSTA interacts with the mobile device's user to obtain sensor readings and user inputs that are utilized to assess whether the mobile device is in fact faulty. The determination of a fault/non-fault condition can then be displayed and/or sent to a third party (such as an insurance company that is being asked to provide policy coverage for the mobile device) in a secure manner (so that the test performed on the mobile device provides a trusted result). In one embodiment, the data sent by the FSTA in the mobile device is encrypted to prevent tampering or spoofing by the user of the mobile device, and is suitably decrypted by the recipient or software running within a server.

In another embodiment, a method is provided for determining that a fault condition exists within a touch-sensitive display of a mobile device, comprising: prompting a user to touch the display; prompting the user to drag the touched point across a displayed pattern; illuminating the display with a painted area to confirm areas touched by the user; measuring a plurality of pressure values measured from the user's contact from the touched point as it is dragged across the display; determining from the plurality of pressure values whether a fault is found in the display of the mobile device by comparing the measured pressure values to a predetermined criterion. Any desired results may be generated, stored in the memory of the mobile device or formatted for transmission to a host server. The test results may comprise any information obtained from the user input to the FSTA or from measurements of sensors by the mobile device or other data such as timing, extent of test completed or other parameters, and may further comprise the status of at least one fault state within the mobile device. Methods of the present invention may further comprise encrypting the test results prior to transmitting the test results to the host server. The results of the determination, test results, and/or other information may be reported to a third party, wherein the third party includes at least one of: the owner of the mobile device, an insurance agency, a potential buyer, a transferee of the mobile device, a law enforcement agency, and a lost device recovery entity. The third party may be informed through any appropriate technique of the results of the determination or of any kind of test results; and in one aspect, the third party accesses a host server to determine whether a fault state exists within the mobile device; the fault state may comprise test results from the mobile device.

There is also provided a method for determining that a fault condition exists within a touch-sensitive display of a mobile device, that includes the steps of: prompting a user to touch a plurality of regions the display; illuminating the display with a painted area to confirm areas touched by the user; accumulating a plurality of magnetometer readings from the mobile device measured when the user touches each of the respective areas; determining from the plurality of magnetometer readings whether a fault is found in the display of the mobile device by comparing the measured magnetometer readings to a predetermined criterion. As in other embodiments, any desired results may be generated, stored in the memory of the mobile device or formatted for transmission to a host server. The test results may comprise any information obtained from the user input to the FSTA or from measurements of sensors by the mobile device or other data such as timing, extent of test completed or other parameters, and may further comprise the status of at least one fault state within the mobile device. Methods of the present invention may further comprise encrypting the test results prior to transmitting the test results to the host server. The results of the determination, test results, and/or other information may be reported to a third party, wherein the third party includes at least one of: the owner of the mobile device, an insurance agency, a potential buyer, a transferee of the mobile device, a law enforcement agency, and a lost device recovery entity. The third party may be informed through any appropriate technique of the results of the determination or of any kind of test results; and in one aspect, the third party accesses a host server to determine whether a fault state exists within the mobile device; the fault state may comprise test results from the mobile device.

An additional embodiment of the present invention provides a system comprising: a mobile device, the device comprising: a processor in communication with a memory; a user interface in communication with the processor, the user interface including a touch-sensitive display and a data entry interface; a communications module in communication with the processor and configured to provide a communications interface to a host server, the host server further including a database; wherein the memory of the mobile device includes instructions that when executed by the processor cause the mobile device to perform the steps of: prompting a user to touch the display; prompting the user to drag the touched point across a displayed pattern; illuminating the display with a painted area to confirm areas touched by the user; measuring a plurality of pressure values measured from the user's contact from the touched point as it is dragged across the display; determining from the plurality of pressure values whether a fault is found in the display of the mobile device by comparing the measured pressure values to a predetermined criterion. In various aspects of the system embodiment, any desired results may be generated, stored in the memory of the mobile device or formatted for transmission to a host server. The test results may comprise any information obtained from the user input to the FSTA or from measurements of sensors by the mobile device or other data such as timing, extent of test completed or other parameters, and may further comprise the status of at least one fault state within the mobile device. Methods of the present invention may further comprise encrypting the test results prior to transmitting the test results to the host server. The results of the determination, test results, and/or other information may be reported to a third party, wherein the third party includes at least one of: the owner of the mobile device, an insurance agency, a potential buyer, a transferee of the mobile device, a law enforcement agency, and a lost device recovery entity. The third party may be informed through any appropriate technique of the results of the determination or of any kind of test results; and in one aspect, the third party accesses a host server to determine whether a fault state exists within the mobile device; the fault state may comprise test results from the mobile device.

BRIEF DESCRIPTION OF THE DRAWINGS

A more complete understanding of the present invention may be derived by referring to the detailed description and claims when considered in connection with the following illustrative figures.

DETAILED DESCRIPTION

Figure 8:
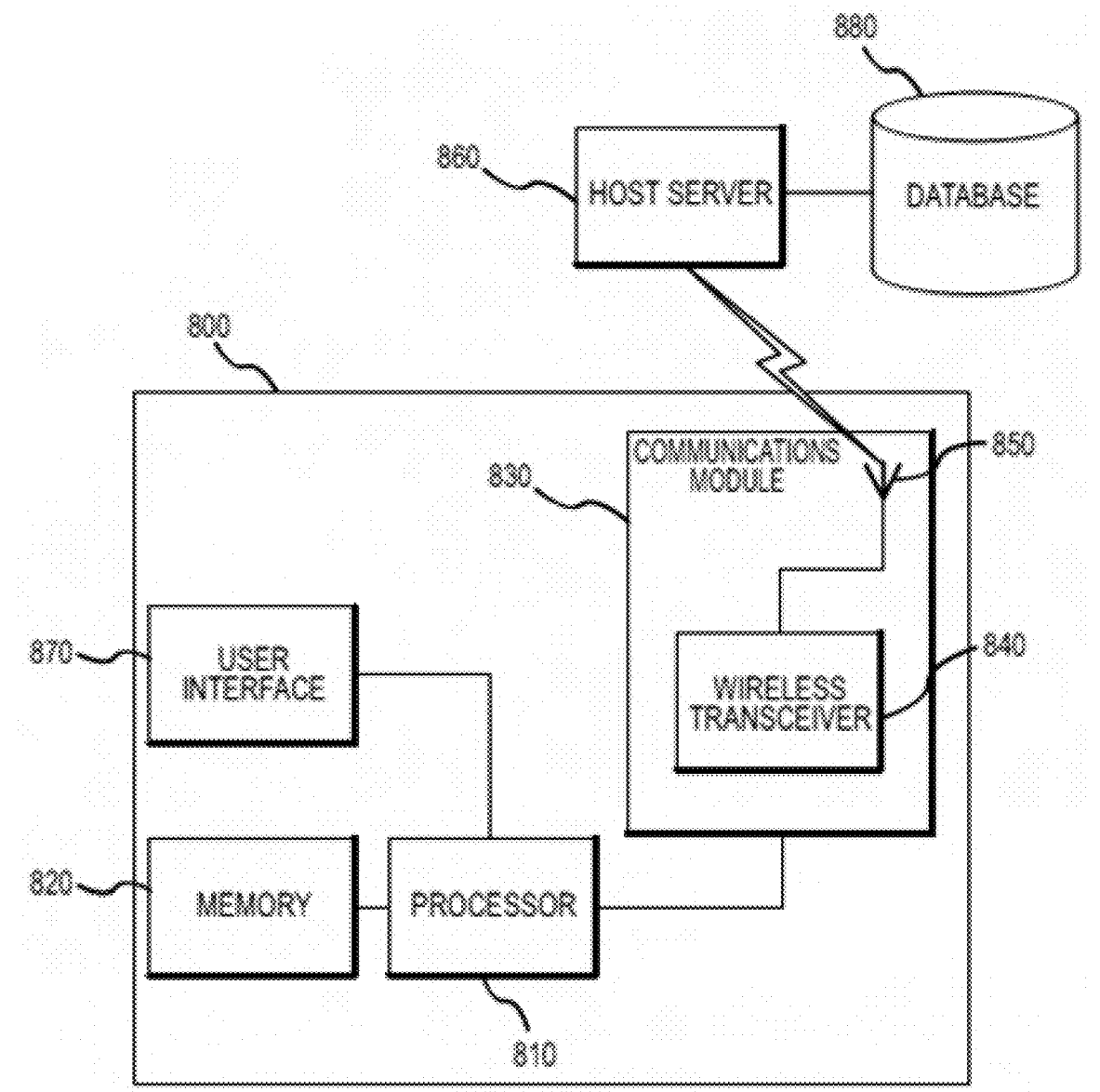
FIG. 8 illustrates a block diagram of a system embodiment of the present invention.

The exemplary system depicted in FIG. 8 comprises a mobile device 800 that includes a processor 810 coupled to a memory 820 which may include volatile memory, non-volatile memory or a combination thereof. A communications module 830 comprises a wireless transceiver 840 for wirelessly communicating with one or more servers 860 and other entities through antenna 850, although those of skill in the art may appreciate that a wired connection may be established to provide connectivity in lieu of or in addition to the wireless connection. The mobile device also includes a user interface 870 coupled to the processor 810. The mobile device 800 may include any suitable power source, such as a battery (not shown). The mobile device 800 may include any other desired components, such as a global positioning system (GPS) to provide geolocation information for locating the mobile device. Some or all of the components of the mobile device 800 may include (or be in communication with) a hardware identification module (not shown) such as a universal subscriber identity module and/or removable user identity module. The hardware identification module may be coupled to the processor 810 and may include an identifier that can be compared to a predetermined identifier to determine whether the hardware of the mobile device 800 has been altered. The hardware identification module (and predetermined identifier) may include any suitable identifier, such as an electronic serial number, a local area identity identifier, an integrated circuit identifier, an international mobile subscriber identifier, an authentication key identifier, and/or an operator-specific emergency number identifier. The identifier may be stored in the memory 820 and transmitted to the host server 860 for comparison to a predetermined identifier.

The functionality of the mobile device 800, including the methods described herein (in whole or in part), may be implemented through the processor 810 executing computer-readable instructions stored in the memory 820 of the mobile device 800. The memory 820 may store any computer-readable instructions and data, including software applications, user-installed or third-party-installed "apps," applets, and embedded operating code.

Additionally, the software application may be configured to operate with minimal underlying hardware functionality. For example, the application may be initiated before the mobile device establishes a network connection. Such a situation may be provided, for instance, when the software application is installed on a SIM card in the mobile device, and the application launches before other software in the mobile device operating system. Alternately or in addition, a data element such as a link or a URL (universal resource locator) may reside on the SIM card, and by launching an application such as a browser with the URL or link, an application referenced by the link or URL may be loaded into the mobile device from a remote server and/or executed directly from on the remote server.

Software performing methods of the present invention may be provided with the device or downloaded onto the mobile device by an authorized user. The functionality of the mobile device 800 may also be implemented through various hardware components storing machine-readable instructions, such as application-specific integrated circuits (ASICs), field-programmable gate arrays (FPGAs) and/or complex programmable logic devices (CPLDs). Systems according to aspects of the present invention may operate in conjunction with any desired combination of software and/or hardware components.

The processor 810 retrieves and executes instructions stored in the memory 820 to control the operation of the mobile device 800. Any number and type of processor such as an integrated circuit microprocessor, microcontroller, and/or digital signal processor (DSP), can be used in conjunction with the present invention. The memory 820 stores instructions, data, messages transmitted from (or received by) the mobile device 800, and any other suitable information. A memory 820 operating in conjunction with the present invention may include any combination of different memory storage devices, such as hard drives, random access memory (RAM), read only memory (ROM), FLASH memory, or any other type of volatile and/or nonvolatile memory. Data can be stored in the memory 820 in any desired manner.

The communications interface 830 communicates with one or more servers 860 or other suitable entities. Any suitable communications device, component, system, and method may be used in conjunction with the present invention. For example, the wireless transceiver 840 may be configured to communicate using any number and type of cellular protocols, such as General Packet Radio Service (GPRS), Global System for Mobile Communications (GSM), Enhanced Data rates for GSM Evolution (EDGE), Personal Communication Service (PCS), Advanced Mobile Phone System (AMPS), Code Division Multiple Access (CDMA), Wideband CDMA (W-CDMA), Time Division-Synchronous CDMA (TD-SCDMA), Universal Mobile Telecommunications System (UMTS), and/or Time Division Multiple Access (TDMA). A mobile device operating in conjunction with the present invention may alternatively (or additionally) include wireless transceiver(s) (and related components) to communicate using any other method of wireless communication protocol, such as an ISO 14443 protocol, an ISO 18000-6 protocol, a Bluetooth protocol, a Zigbee protocol, a Wibree protocol, a WiFi protocol, an IEEE 802.15 protocol, an IEEE 802.11 protocol, an IEEE 802.16 protocol, an ultra-wideband (UWB) protocol; an IrDA protocol, and combinations thereof. The antenna 850 may be configured to transmit and receive any wireless signal in any format, and may comprise a plurality of different antennas to transmit and receive using different wireless protocols.

The communications module 830 can communicate with the server 860 or another device using any other form of connection, such as a wired Internet connection, a wireless Internet connection, a cellular telephone network connection (including a data link connection), a wireless LAN connection, a wireless WAN connection, an optical connection, a USB connection, a mobile device synchronization port connection, a power connection, and/or a security cable. The communications module 830 can be used to communicate with one or more companion devices to monitor the position or status of the mobile device 800 (e.g., by monitoring whether a communication link between the mobile device and companion device is intact), as well as with any number of other devices to help track/locate a lost or stolen mobile device 800.

The mobile device 800 includes a user interface 870. The user interface 870 may include any number of input devices (not shown) to receive commands, data, and other suitable input from a user, as well as any number of output devices (not shown) to provides the user with data, notifications, and other suitable information from the mobile device 800.

Any number of input devices may be included in the user interface 870 such as a touch pad, a touch screen, and/or an alphanumeric keypad to allow a user to enter instructions and data into the mobile device 800. The touch screen may have sensors that can measure parameters from the user's interaction, and such sensors may measure capacitance, resistance, pressure, or differential readings resulting from movement of a "touch" to the screen. The user interface 870 may be configured to detect pressure exerted by a user on the keys of a keypad, as well as the time interval between key presses in order to determine if the current user is authorized to use the device. The user interface may also include a microphone to allow the user to provide audio data to the mobile device 800, as well one or more cameras to allow the mobile device to capture still or video images. In one embodiment, the mobile device 800 comprises a front-facing camera that faces the user when the device is in operation, and a rear-facing camera on an opposite side of the mobile device. The mobile device 800 may include speech recognition software to process verbal input through the user interface 870. The user interface 870 may also include any number of suitable output devices, such as a display screen to visually display information (such as video and text), and/or a speaker to provide auditory output. The display of the mobile device may be configured to sense user touches by any appropriate means, such as capacitive sensing, pressure sensing, gel displacement sensing, resistive sensing, or any other appropriate or conventional touch sending technology utilized by those of skill in the relevant arts. The mobile device 800 may be configured to provide words, phrases, tones, recorded music, or any other type of auditory output to a user through the speaker. As discussed previously, the user interface 870 can be activated to provide information and/or hinder the operation of the mobile device 800 when an unauthorized user attempts to use the mobile device 800. For example, the illumination level of the display may be modulated to draw attention to the mobile device, and unpleasant and/or loud sounds can be played over the speaker.

The mobile device 800 may include one or more biometric devices configured to receive biometric information, such as a fingerprint scanner, an iris scanner, a retinal scanner, and/or a breath analyzer. Input devices such as a microphone or camera may also be utilized to perform biometric analyses, such as a voice analysis or facial recognition. Further, the mobile device may include a magnetometer for measuring magnetic fields (such as may be utilized in an electronic compass), a MEMS or other type of gyroscope for measuring attitude, and accelerometers for measuring changes in movement of the mobile device.

Information provided or received by the user interface 870 may be in any appropriate format. For example, a user interface that communicates information to a user in an auditory format may first provide a data header followed by a data value to identify the data to the user. The user interface 870 may provide information in any number of desired languages, regardless of whether the information is provided audibly or visually.

The user interface can also provide/receive information to a user in a machine-readable format. In one exemplary embodiment of the present invention, for example, the user interface 870 of a mobile device 800 may send and receive messages using dual-tone multi-frequency (DTMF) tones. The mobile device 800 can be configured to send, receive, and process machine-readable data can in any standard format (such as a MS Word document, Adobe PDF file, ASCII text file, JPEG, or other standard format) as well as any proprietary format. Machine-readable data to or from the user interface may also be encrypted to protect the data from unintended recipients and/or improper use. In an alternate embodiment, a user must enter a passcode to enable use of some or all of the functionality of the mobile device 800. Any other user interface feature may be utilized to allow a human or non-human user to interact with one or more devices operating in conjunction with the present invention.

The mobile device 800 may include any other suitable features, components, and/or systems. For example, the mobile device 800 may be configured to preserve the life of its battery by shutting off some or all of its components, such as a camera or microphone. Components can be selectively shut down in response to a security compromise event, as well as in response to a command from an authorized user or security authority. Alternately, the mobile device 800 can be configured to use its components excessively to drain the battery as quickly as possible, to, for example, limit the usefulness of the mobile device 800 to an unauthorized user.

The mobile device 800 may be configured to implement one or more security measures to protect data, restrict access, or provide any other desired security feature. For example, a mobile device 800 may encrypt transmitted data and/or data stored within or created by the device itself. Such security measures may be implemented using hardware, software, or a combination thereof. Any method of data encryption or protection may be utilized in conjunction with the present invention, such as public/private keyed encryption systems, data scrambling methods, hardware and software firewalls, tamper-resistant or tamper-responsive memory storage devices or any other method or technique for protecting data. Similarly, passwords, biometrics, access cards or other hardware, or any other system, device, and/or method may be employed to restrict access to any device operating in conjunction with the present invention.

The host server 860 communicates with mobile devices 800, authorized users, unauthorized users, security authorities, (insurance agencies in particular) and other entities to monitor and protect the mobile devices 800 from unauthorized use and to mitigate the harm associated with a security compromise event or attempted fraud. The host server 860 may comprise any number of separate computer systems, processors, and memory storage devices, as well as human operators (e.g., to answer calls from authorized users reporting the loss/theft of a mobile device) and any other suitable entity. The host server 860 may include, or be in communication with, one or more databases 880 storing information regarding authorized users and mobile devices 800 in order to monitor and track the mobile devices 800 and provide instructions to the mobile devices 800 in the event a security compromise event occurs.

For example, a database 880 may store a usage profile for a mobile device to allow software on the host server 860 to detect whether continued usage of the mobile device deviates from the usage profile by a predetermined threshold, or whether the mobile device has incurred a loss event resulting in a fault state within the mobile device 800. The host server 860 may also receive, process, and store (e.g., in the database 880) information from the mobile device 800. The host server 860 may handle any type of data in any format to achieve any purpose, such as receiving and processing environmental parameters captured by the mobile device to track the position and location of the mobile device 800 as discussed previously. The database 880 may also store location information that can be used to determine whether the mobile device 800 is operating in a valid location (e.g., "whitelisting" and "blacklisting" as discussed previously).

Databases 880 in communication with the host server 860 may also store archived data from mobile devices 800 for recovery in the event the mobile devices 800 are lost or stolen, or the data on the mobile devices 800 is destroyed (e.g., by a virus or other malicious program). The functionality of the host server 860 may be performed automatically or semi-automatically, such as through software/hardware operating on one or more computer systems, and/or by one or more human operators.

The host server 860 may include one or more system processors that retrieve and execute computer-readable instructions stored in a memory to control (at least partially) the operation of the host server 860. Any number and type of conventional computer, computer system, computer network, computer workstation, minicomputer, mainframe computer, or computer processor, such as an integrated circuit microprocessor or microcontroller, can be used in conjunction with the present invention. Computer systems used in accordance with aspects of the present invention may include an operating system (e.g., Windows NT/95/98/2000/XP/Vista/7/8/10, OS2, UNIX, Linux, Solaris, MacOS, etc.) as well as various conventional support software and drivers typically associated with computers. In certain embodiments, dedicated applications may be entirely or partially served or executed by the system processor to perform methods of the present invention The host server 860 may be accessed in any desired manner, such as through a website on the Internet, and/or through a telephone network. The host server 860 may include any number of human operators, computer systems, mobile telephones, mobile computing devices, interactive voice response (IVR) systems, and any other suitable system and device for communicating with a user, security authority, computing device, or other entity. The host server 860 can communicate with unauthorized users of a lost or stolen mobile device, both through the mobile device or through other communication methods, including direct communication with a fault state test application (alternatively, as used herein, "FSTA") installed on the mobile device. The host server 860 may notify the unauthorized user that the mobile device is lost or stolen, provide recovery information (such as a shipping address) to the unauthorized user, forward test result and damage claim information to a third party insurer, and facilitate initiation of an insurance claim. The host server 860 also communicates with the mobile device 800 to provide software updates, receive data for archival, identify files and other data to be protected, and to perform any other aspect of the present invention.

The host server 860 may be controlled by, or operate in conjunction with, an authorized user, telecommunications service provider, mobile device monitoring/tracking service provider, security authority, and/or any other desired entity. For example, authorized users and security authorities may communicate with or through the host server 860 to interact with the fault state test application (FSTA) installed on mobile device 800 to confirm that the device has incurred a fault that may be subject to an insurance claim. The host server 860 may be configured to provide notifications on how to return a lost/stolen mobile device 800, detect a security compromise event, detect that a fault state has arisen on the mobile device, and determine whether a mobile device's functionality should be altered and (if so) determine the manner in which the functionality of the mobile device 800 should be altered. The host server 860 may operate in conjunction with any other desired systems, devices, human operators, or other entities.

The FSTA may gather information from the tested mobile device to be relayed to the third party along with the results of the device test. Any appropriate data may be included in the information relayed to the third party, such as a device type, a manufacturer, a model number, a serial number, a manufacturing date, a hardware configuration list, a memory capacity, a software manifest, a list of operable features, a list of inoperable features, an electronic serial number, an ESN, an IMEI number, an international mobile equipment identifier number, an IMSI number, an international mobile subscriber identity number, a UIMID number, and a user identity module identifier, test results, and fault conditions. Mobile devices that utilize SIM cards (such as interchangeable Subscriber Identity Modules commonly used with cellular telephones) can be further used with embodiments of the present invention in determining that at least one of the stored device configuration parameters includes an IMSI number within a SIM of the device.

Embodiments of the present invention that test the mobile device also have wider purposes beyond testing mobile devices for fractured glass; for example: full digitizer could be tested as the screen is painted in full (as described more completely below). Further, a darkened display/screen could be tested by a point test (e.g. sensors might be working but the LCD could be broken). Likewise, to verify that the input from the user is accurate, in one implementation the user would not be able to see points to complete test whereas in normal paint mode, the user might try to paint full screen to fool test. Also, color could be tested; for instance, the user could be prompted to press the 2 displayed greens then press the two reds and finally press the 2 blues (for example).

Further, in one embodiment, a company that sells mobile devices may want to know immediately if a device in the field has incurred a fault condition (such as a cracked display) so that a new model can be offered to the device owner. This may be especially relevant in the case where a Mobile Network Operator (MNO) offers devices for sale that are subsided by the payment of the service plan's monthly fees over a contractually-obligated period of time—the MNO benefits because they can renew and extend the service agreement, and the device manufacturer benefits because they can sell new devices to replace faulty ones.

Additional or alternate system implementations of embodiments of the present invention include:

Mobile Device Insurance: embodiments of the present invention provide for verification of phone condition in the second-hand mobile device insurance market, as well as providing the capability to support selective insurance or variable policy provisions related to provable state/functionality of the mobile device hardware (e.g. screen not cracked results in full insurance for mobile device, but a cracked screen but otherwise functional device may allow for a policy to cover the device except for glass damage). Likewise, embodiments of the present invention provide for verification that the phone being checked is the one being insured (e.g. through transmission of mobile device ID information such as IMEI information or other data described herein as part of the test). Further, embodiments of the present invention may be used in identifying that the mobile device is the correct device under warranty before it is returned for repair of screen to reduce spurious claims. Such may occur, for example, for an insured device, when a repair company doesn't really repair a broken device, but instead fraudulently splits insurance payout with a person whose phone was insured.

Mobile Device Transfer: Embodiments of the present invention may be utilized to validate that the phone that was tested is the one actually handed over in a transfer of possession/ownership.

Lease Return State Verification: aspects of the present invention provide for determination of condition for lease return (for example, if a leased mobile device must be returned at end of lease, if the condition of the mobile device has fallen below a predetermined agreed-upon state (i.e. display must not be cracked at time of lease return) then the customer must pay an additional fee for the excessive wear/damage).

Purchase/Shipping State Verification: The FSTA could be used for verification by a consumer buying the device online (for example, through eBay) where the seller is not completely trusted. Also, the FSTA could be used to ascertain a current level of damage i.e. the display may be cracked but to what extent (in various embodiments it is anticipated that a consumer or company would pay additional money as the know screen condition is not too badly damaged as to become unacceptable). Additionally, embodiments of the present invention provide proof by a warehouse that the mobile device was in acceptable condition when it was dispatched. When the FSTA is used a verifier in the situation where a person is purchasing a used mobile device from another source, the buyer may request the seller install a trusted screen verifier app, put the buyer's email address or SMS number in the FSTA to provide confirmation, the FSTA runs the test and sends the results to the buyer, thus verifying the used device does not have known faults (such as a cracked screen). Further this might be desired by the seller, who wants to verify before shipping, that the device is operating as expected, so that they are not accused of sending a faulty device to the recipient.

Legal Status Determination: Aspects of the present invention may support collaboration with third parties (or a police database) in confirming that the mobile device is not lost/stolen/subject to outstanding charges.

There are several embodiments provided for herein to perform the fault state assessment, including the FSTA conducting a pressure sensor-based test, a magnetometer-based test, or a pixel-based test, along with several system-based use scenarios presented; while each type of FSTA test is intended to be able to determine a crack individually, the various types of crack detection approaches may be combined as desired for any purpose, such as increased accuracy. While in a preferred embodiment, the FSTA may be installed in and run resident within the mobile device, those of skill in the art may appreciate that the FSTA may be executed in other manners, such as an OTA (over the air) application; deployed through a website and side loaded to a connected mobile device; loaded through a piece of in-store hardware (e.g. raspberry pie) or purpose-built instore device; or loaded and executed from a mall or store vending machine. Further, all or part of the FSTA and system implementation embodiments may be included in a library of apps utilized by entities that provide online quotes for insurance, device trade in, or mobile device diagnostics.

Pressure Sensor Based Test:

In mobile devices equipped with pressure sensors, the FSTA is configured to obtain pressure sensor readings from touches to the display of the mobile device. By prompting the user to touch certain areas of the screen, simultaneously touch multiple areas of the screen, or drag touches across multiple areas of the screen, (or any other desired combination) the FSTA can obtain a collection of pressure measurements from the touches and determine whether the display/screen is cracked. While typically a user's finger press causes a "touch" to occur, those of skill in the art appreciate that in embodiments of the present invention, any body part or mechanical stylus may be used in addition to or in replacement for a finger when executing a "touch" to the display.

Figure 1:
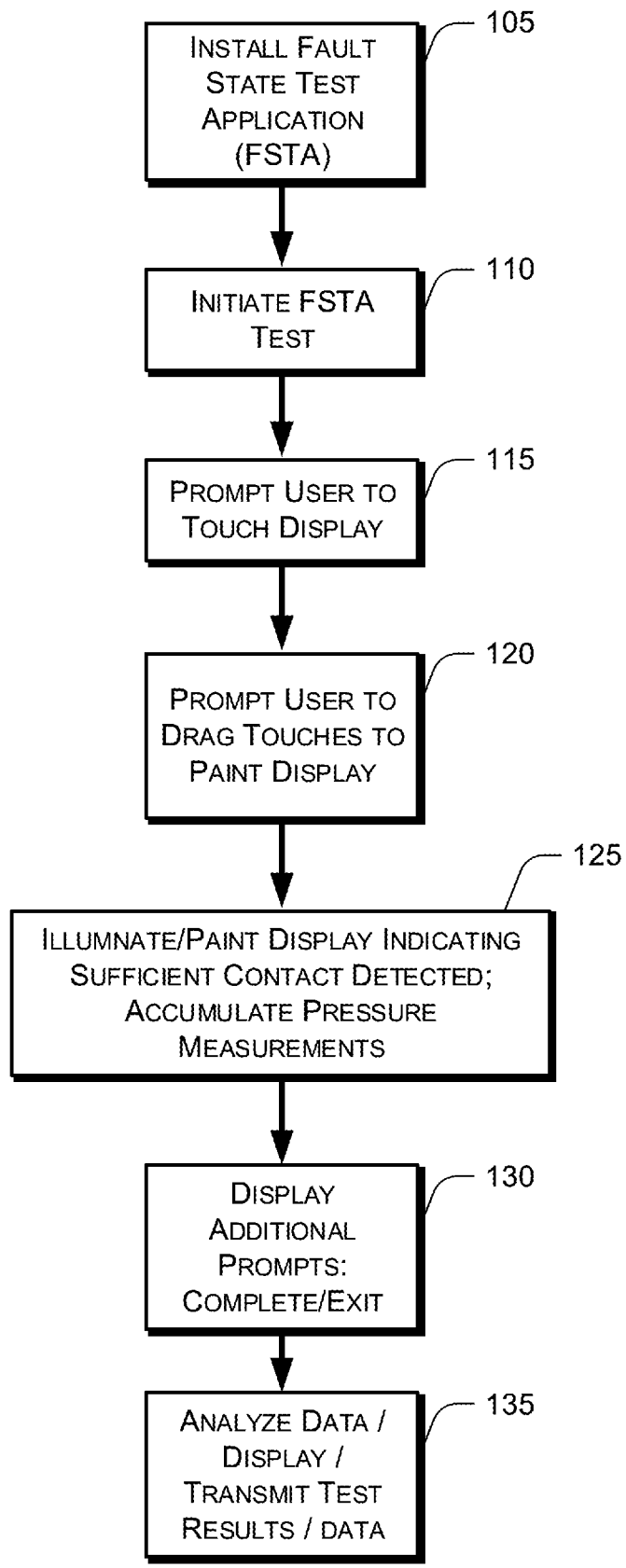
FIG. 1 illustrates a flowchart of an exemplary method of the present invention.
Figure 2:
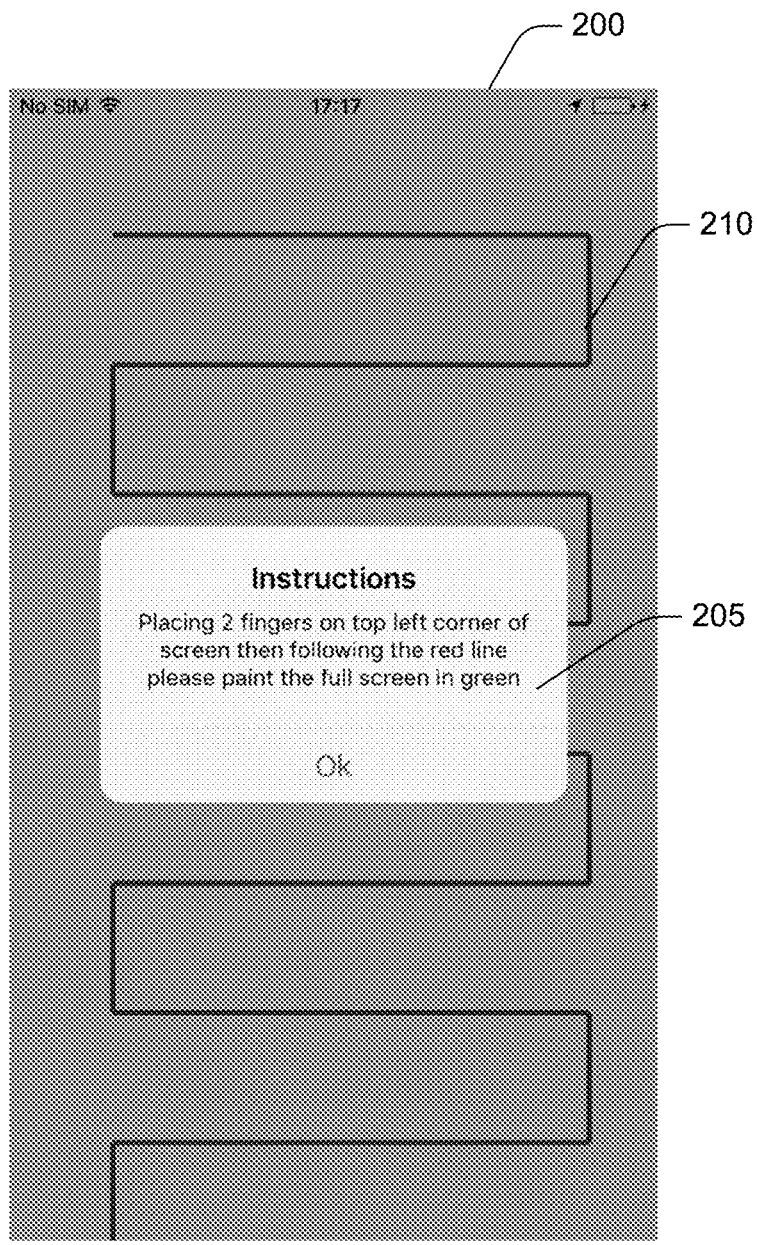
FIG. 2 depicts an exemplary display of a mobile device with instructions and prompts to the user.
Figure 3:
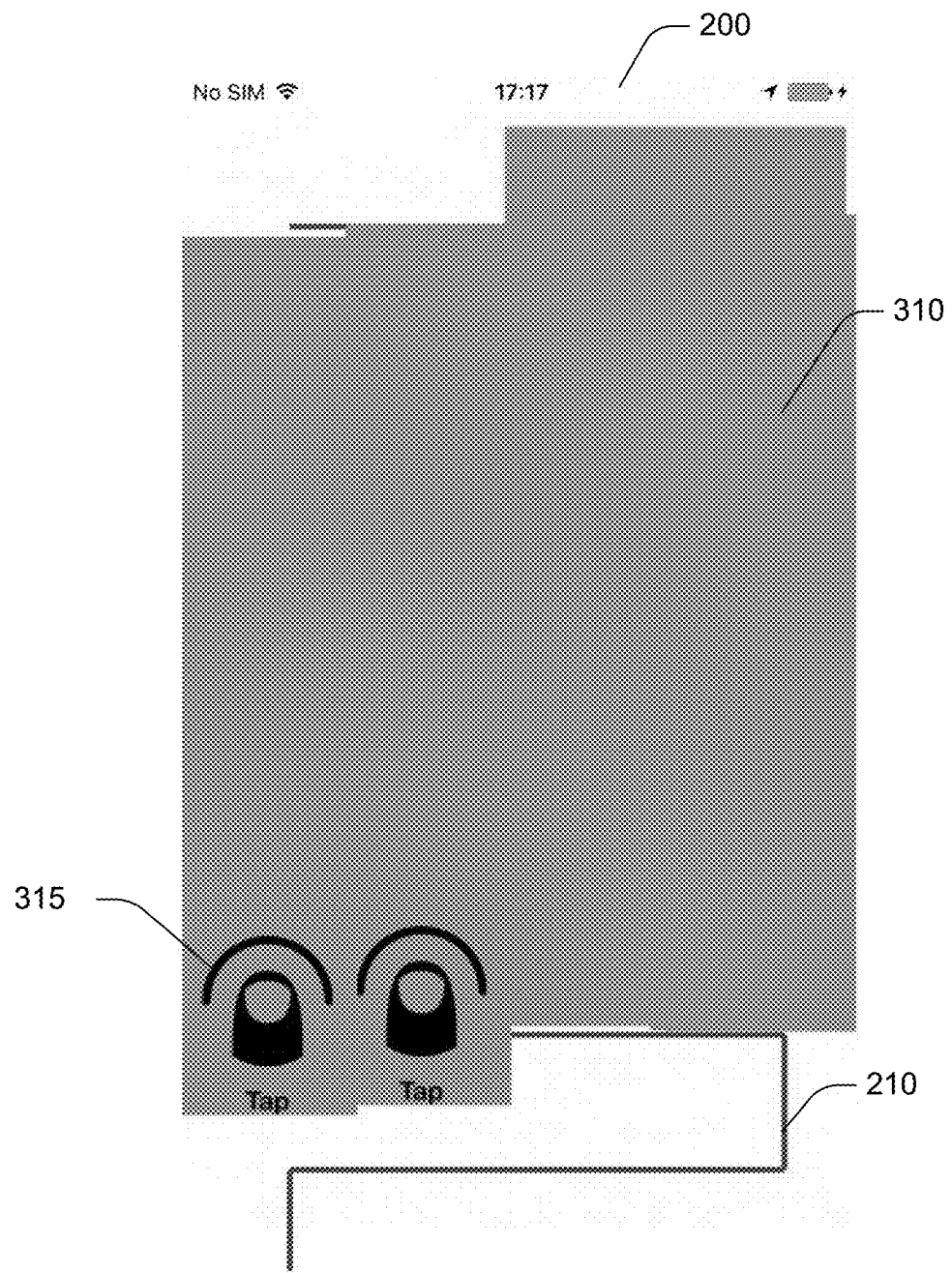
FIG. 3 depicts another exemplary display of a mobile device with instructions and prompts to the user.
Figure 4:
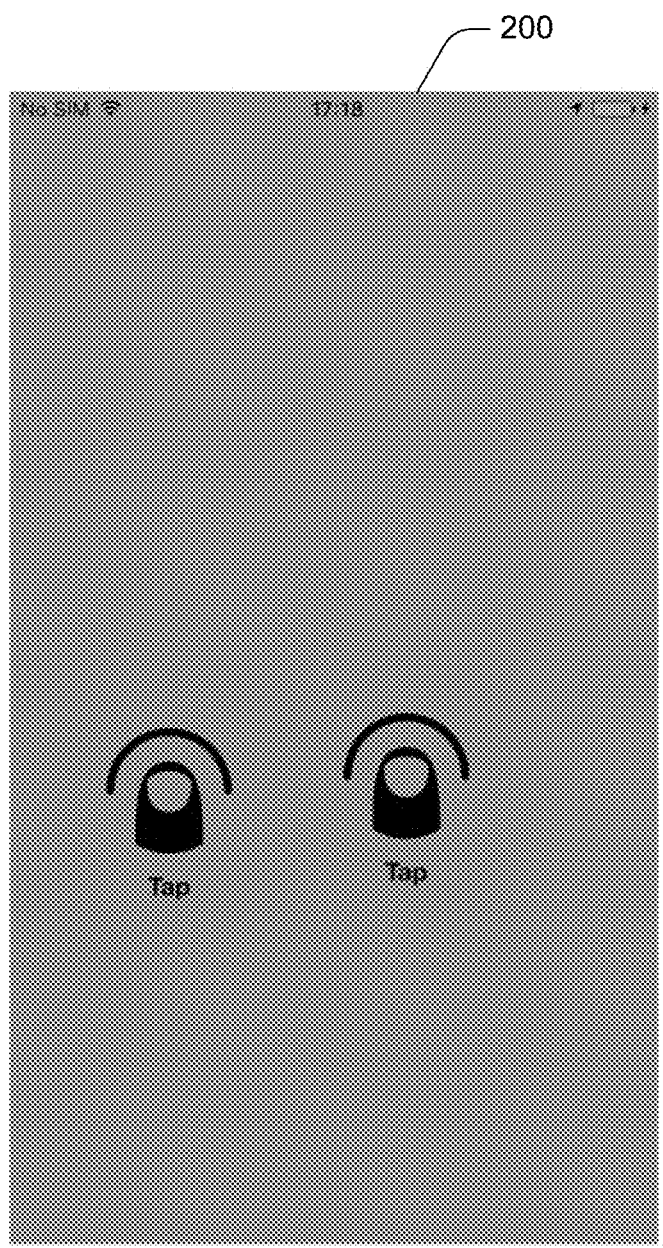
FIG. 4 illustrates one aspect of a display of an exemplary mobile device of the present invention that had been successfully and completely painted

In one preferred embodiment shown in FIG. 1, the user executes 110 the FSTA app (after installation 105, if the app had not already been installed), and the user is prompted 115 by the FSTA to touch two fingers to the display, either left finger first then right finger, or right finger first then left finger, or both approximately simultaneously, as may be desired in obtaining the most appropriate pressure readings. The FSTA detects the pressure readings for each touch zone, and the test proceeds by prompting 120 the user to drag the two fingers across the screen to "paint" the screen, as FSTA displays illumination 125 on the display when it has detected touches of sufficient measured pressure in the areas. The user may be prompted to simply drag both fingers in any direction until the entire screen is "painted" by the FSTA app (after it detects all areas of the screen have received the appropriate drag touches) or preferably, to follow a particular path in "painting" the screen with the two finger touches. FIG. 2 shows an exemplary display 200, with a prompt 205, and a pattern 210 for the user to follow in "painting" the display 200. While a serpentine pattern is shown, alternative patterns may be used depending on the mobile device type, the pressure sensor configuration, or other factors. FIG. 3 shows a partially "painted" display 200 with the pattern 210 for the finger touches, and color 310 filling the display 200 where the two finger touches 315 had followed the pattern 210. FIG. 4 shows one aspect of a display 200 that had been successfully and completely painted, with all areas of the pattern prompt 210 covered. While embodiments shown herein show a completely painted display as an exit criterion, various embodiments anticipate the possibility of painting just a portion of the display, painting no parts of the display, or halting the test as soon as a fault condition (e.g. a crack) is detected without painting or covering the entire display.

Alternatively or in combination, the FSTA may present the prompts in a game-like manner, prompting the user, for instance to drag the fingers to move one displayed object toward another (for example: moving an image of a rabbit toward a carrot, or helping someone through a maze like a kids puzzle, or pressing and sliding the blocks into the right order to complete a picture), or to "capture" an item moved across the display, thus prompting the user to touch the desired sections of the screen. Alternatively, or in combination, more than two fingers may be used simultaneously on the display, such as three or four fingers placed on the display significantly spaced apart, then dragged together toward a prompted location.

The FSTA monitors the progress of the user in completing the test, and if necessary, prompts the user 130 to complete or end the test. Once the test is complete, the FSTA analyzes the accumulated pressure data to attempt to determine anomalies such as touch pressure reading changes that indicate that predetermined thresholds have been met for determining that a crack may be present in the display 200. In one embodiment, when a pressure reading of one of the touched areas falls off by more than a predetermined threshold, a display anomaly such as a crack may be determined to be present. In various embodiments, the predetermined fall-off thresholds may comprise 5%, 10%, or 50%). In other embodiments, when pressure from one finger touch falls to less than a predetermined amount of its previous value, a discontinuity in the display is likely (in one example, the predetermined amount may be 10% or 50% of its average reading). In yet another embodiment, the difference in pressure readings between finger touches is compared over time, and if the difference between the pressure readings varies more than a predetermined difference threshold, a crack may be determined to be present within the display. In yet another embodiment, a drop then rise in pressure readings from at least one of the finger touches may indicate the presence of a crack in the display. In a further embodiment, a rise then drop in pressure readings from at least one of the finger touches may indicate the presence of a crack in the display.

Figure 5:
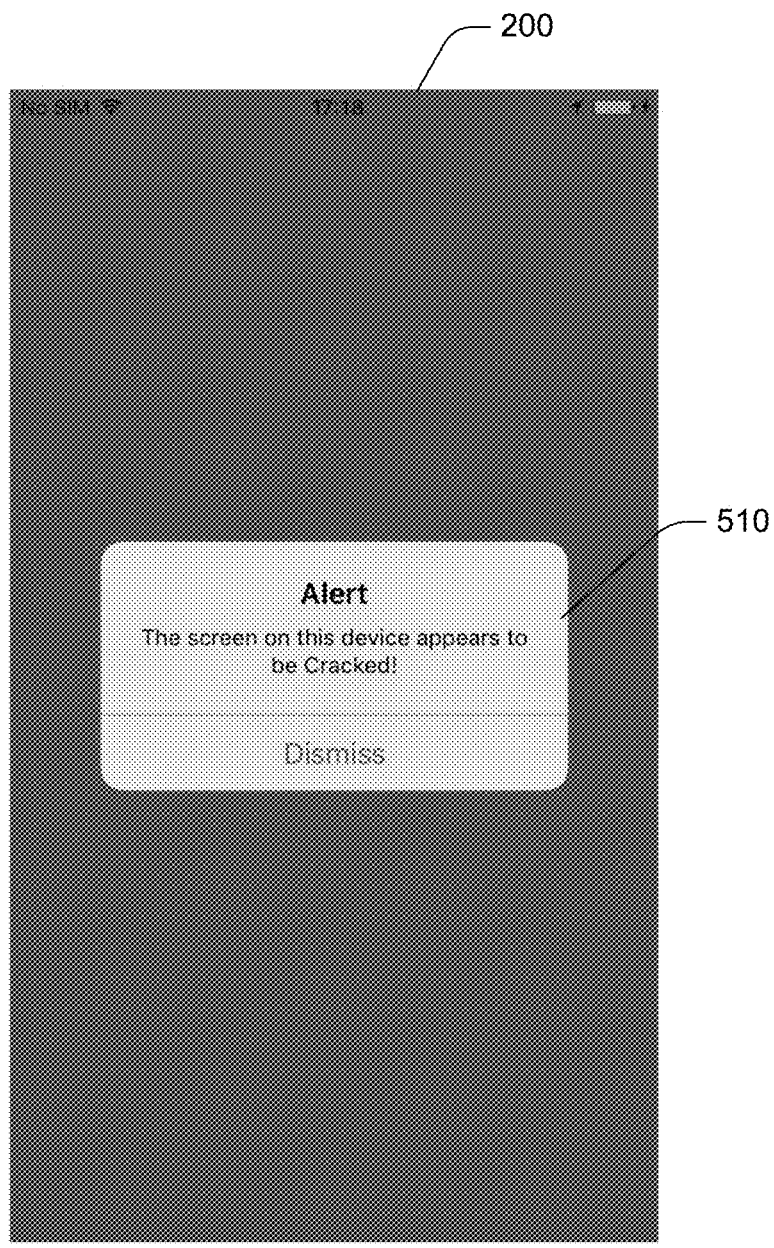
FIG. 5 shows a display of an exemplary mobile device of the present invention with an indication that a crack has been detected in the display
Figure 6:
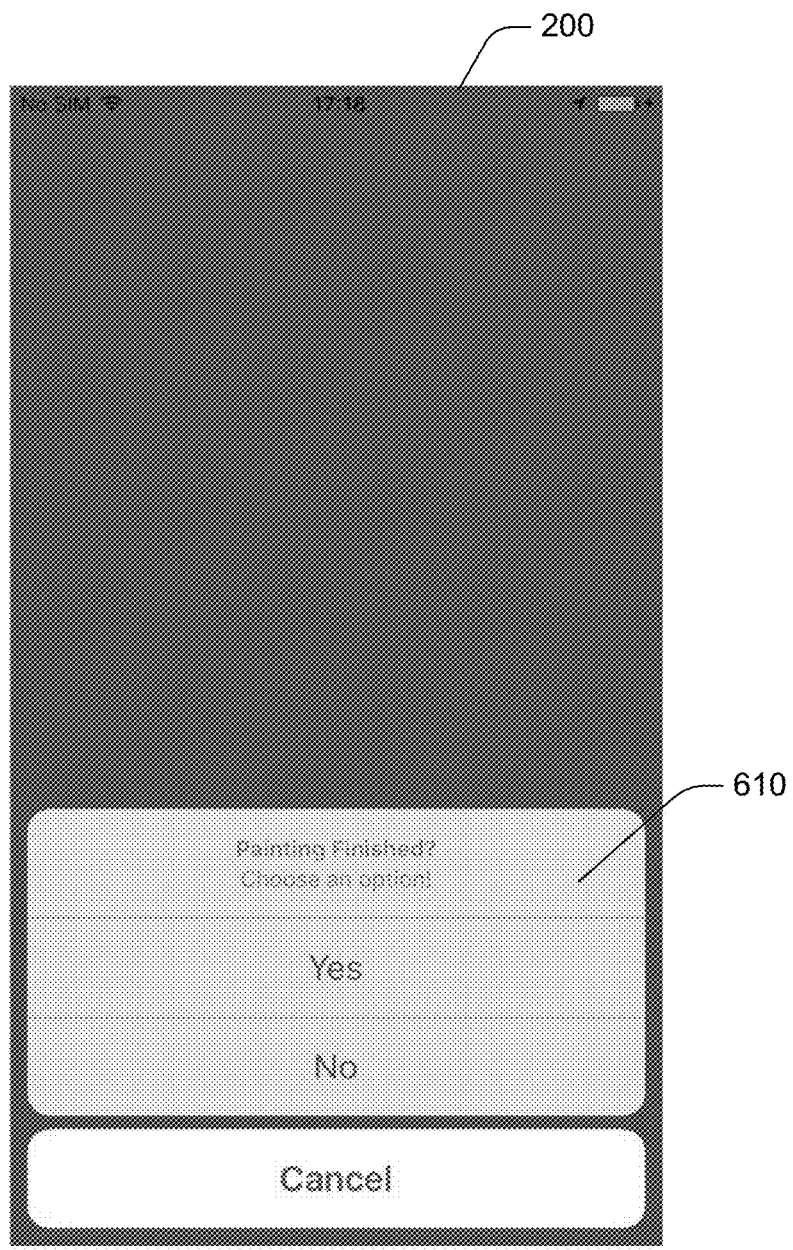
FIG. 6 shows one embodiment of a display of a mobile device of the present invention, where the user is being prompted to end or continue the test.

After analysis is complete, the appropriate test result is displayed 135 and/or transmitted (optionally, along with mobile device ID information and accumulated test data) to a central server 860 and/or to a third party, such as an insurance agency, a mobile network operator, a mobile device manufacturer, or to any entity for which fault states of the mobile device are of importance. In one embodiment, FIG. 5 shows an indication 510 that a crack has been detected in the display. FIG. 6 shows one embodiment, where the user is being prompted 610 to end or continue the test.

As mentioned above, while the user is making the prompted movements as described, the FSTA accumulates and stores pressure data for each of the touched (or swiped/dragged) zones over time. In doing so, the FSTA can use predetermined methods to analyze anomalies in the accumulated pressure measurements that may indicate the presence of one or more a cracks in the display of the mobile device. For example, in the case of mobile devices with pressure-sensitive displays (such as certain iPhone models), the FSTA may record and identify significant pressure drop-off anomalies when the finger pad passes a discontinuity in the screen (such as a crack). The FSTA may then take the appropriate action to report status to the user, and alternatively to the outside entity as mentioned above.

Magnetometer-Based Test.

In another embodiment, the mobile device 800 includes a magnetometer that may be accessed by the FSTA to accumulate magnetometer readings, and in conjunction with prompted touches by the user of the mobile device, the FSTA may detect fault conditions such as screen cracks that arise from pressure changes sensed by the magnetometer when the user presses certain areas of the screen. While typically a user's finger press causes a "touch" to occur, those of skill in the art appreciate that in embodiments of the present invention, any body part or mechanical stylus may be used in addition to or in replacement for a finger when executing a "touch" to the display.

Figure 7:
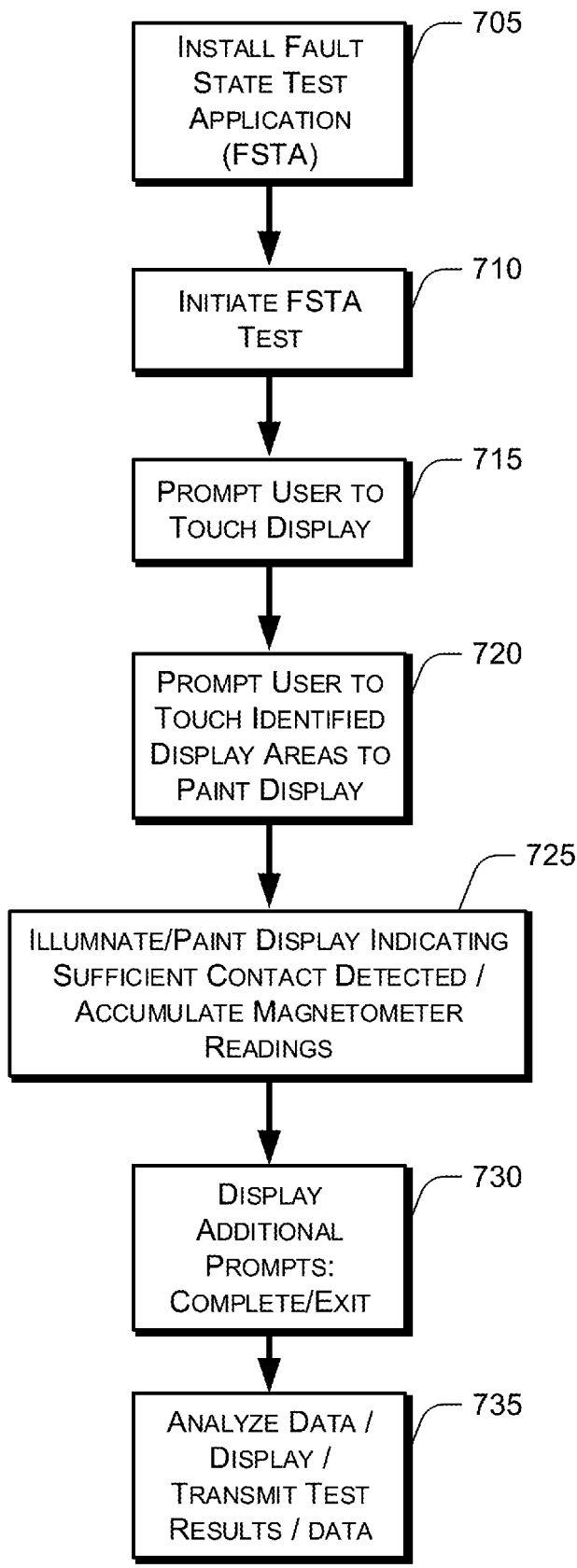
FIG. 7 illustrates a flow chart depicting a preferred embodiment of the present invention.

In one preferred embodiment shown in FIG. 7, the user executes 710 the FSTA app (after installation 705, if the app had not already been installed), and the user is prompted 715 by the FSTA to touch (see also FIG. 9, 905) the display 200, with a pattern presented to the user (see also FIG. 9, 910) that will need to be filled in from discrete finger touches, as prompted 720 by the FSTA. In this embodiment, the FSTA will measure and accumulate magnetometer readings as each prompted area 910 is pressed by the user, and if sufficient pressure is applied, each individual area of the display 200 is "painted" 725 to provide user feedback (see FIG. 10, showing partially painted section 1005, and unpainted part of pattern 910). While painting the display, the FSTA detects and accumulates the magnetometer readings for each touched zone 725, and the test proceeds until a predetermined amount of the display 200 has been painted. In various embodiments, substantially all of the screen will be required to be "painted"; in alternate embodiments, a subset of the screen area will need to be painted, and in an additional embodiment, the test only continues until the magnetometer readings indicate that a crack has been detected.

Figure 9:
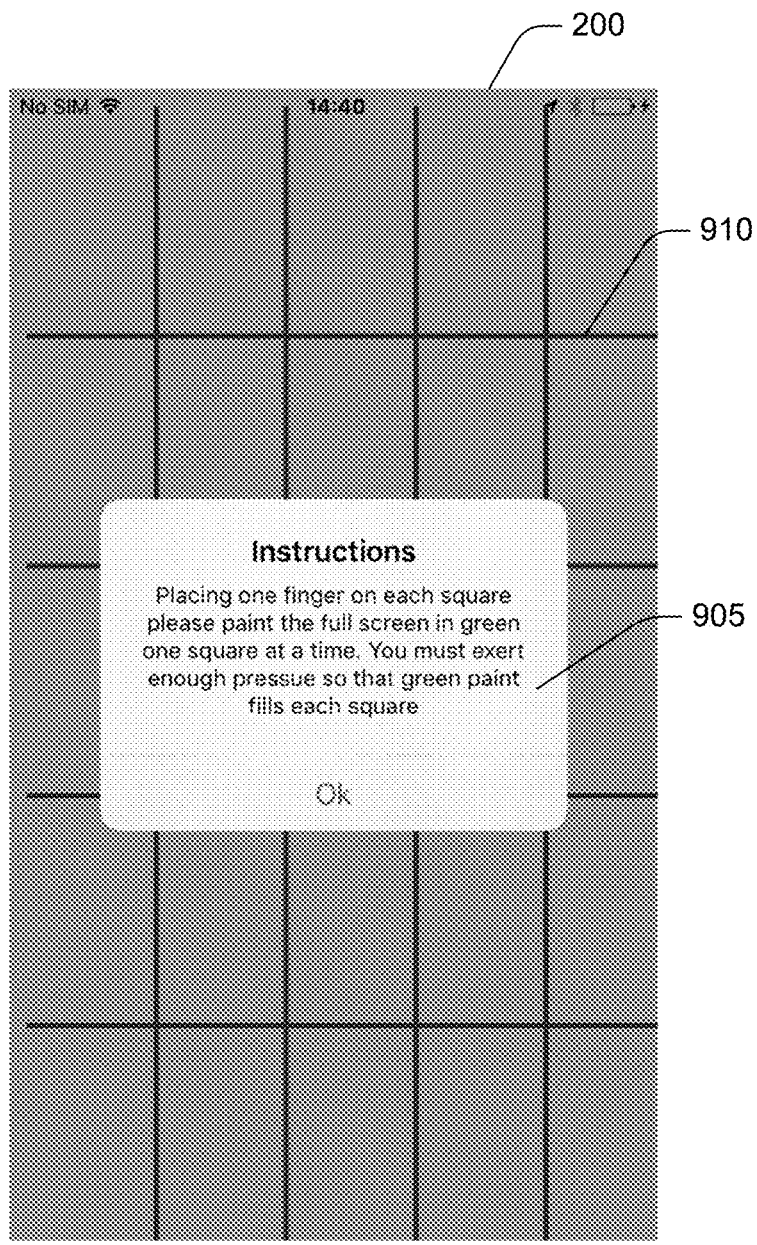
FIG. 9 shows an exemplary display of a mobile device of the present invention, with a prompt and a pattern for the user to follow in "painting" the display of the mobile device.
Figure 10:
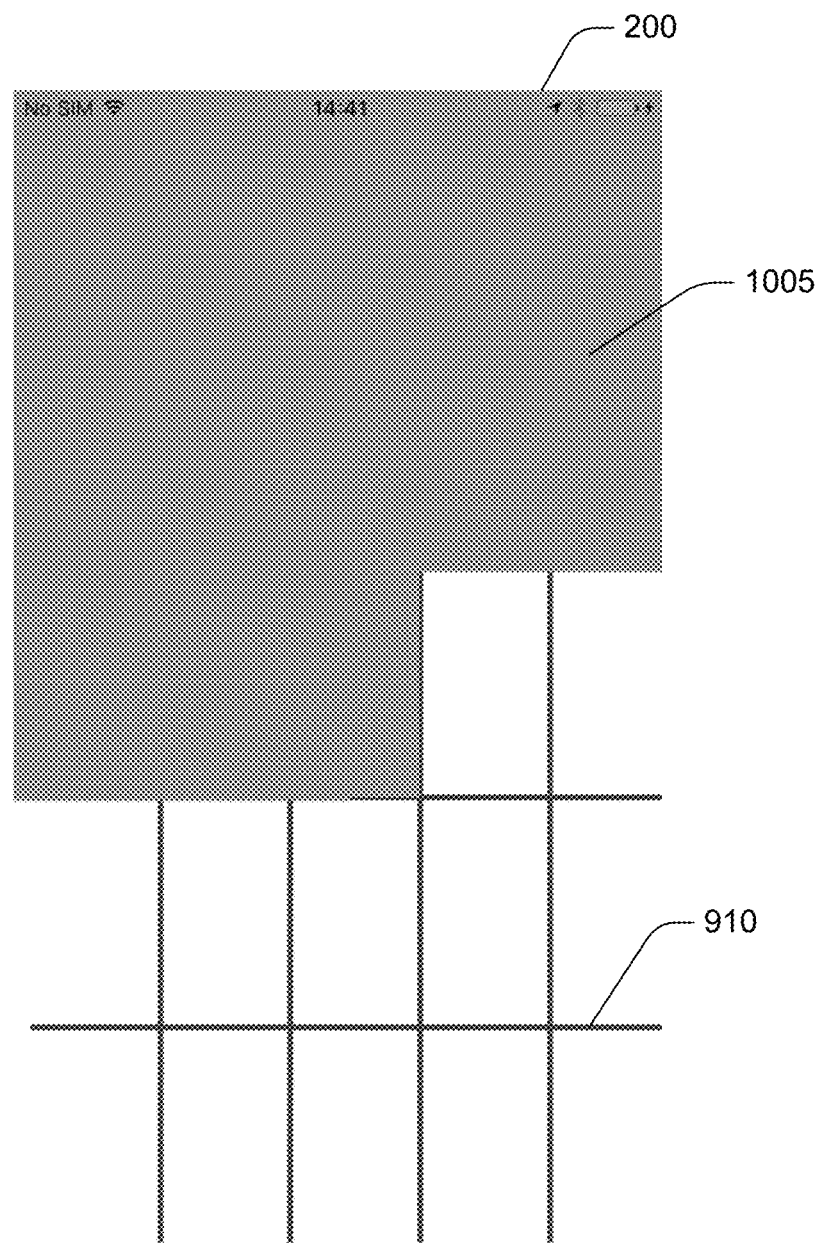
FIG. 10 shows an exemplary display of a mobile device of the present invention, with a partially "painted" display.
Figure 11:
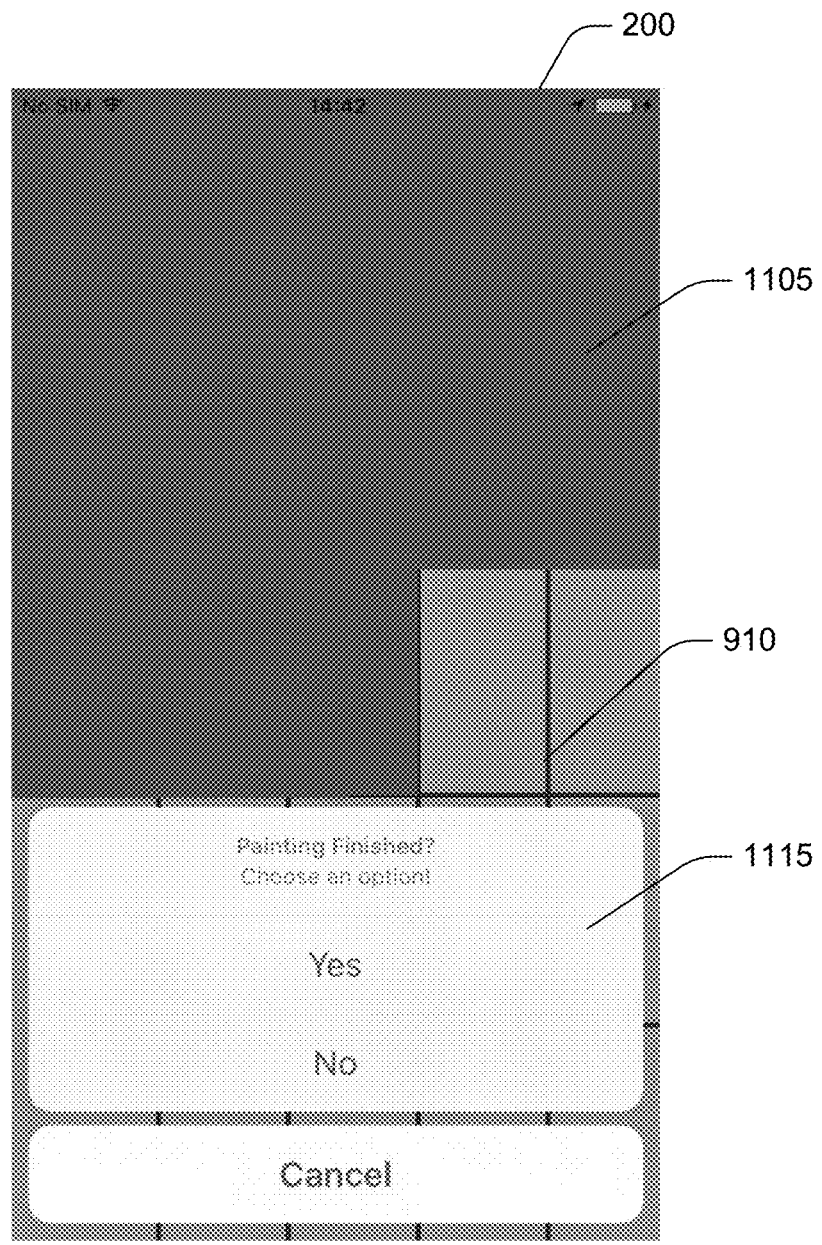
FIG. 11 shows an exemplary display of a mobile device of the present invention, where in one aspect of the display had been partially painted.
Figure 12:
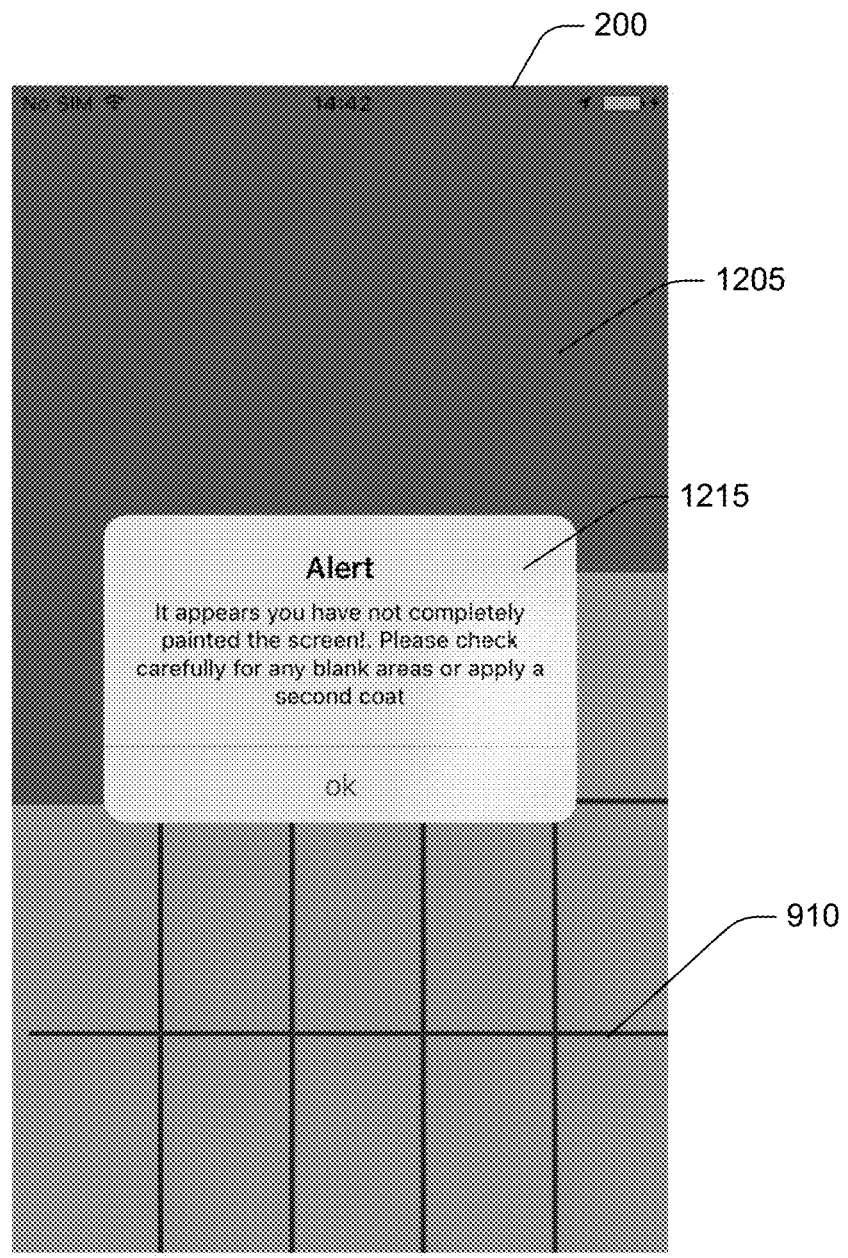
FIG. 12 shows an exemplary display of a mobile device of the present invention, where in one aspect a prompt is presented to the user.
Figure 13:
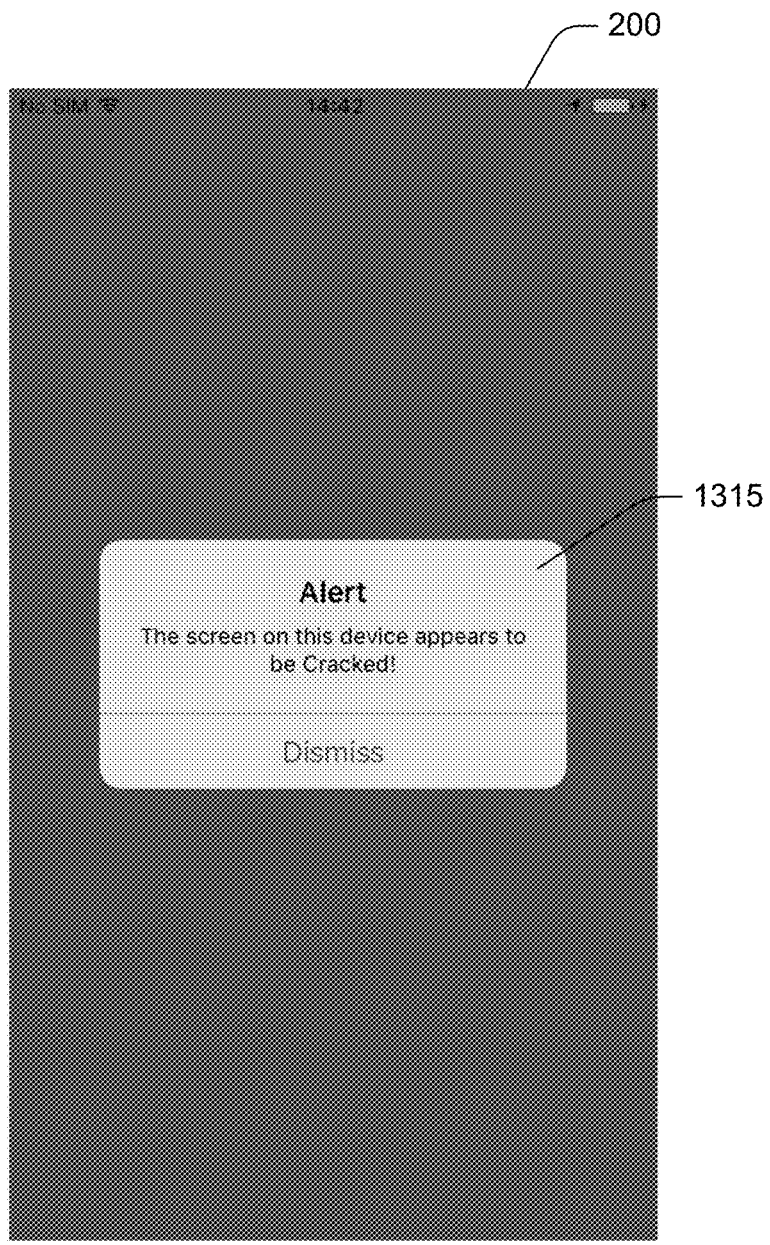
FIG. 13 shows an exemplary display of a mobile device of the present invention, where in one aspect a prompt is presented to the user.

FIG. 9 shows an exemplary display 200, with a prompt 905, and a pattern 910 for the user to follow in "painting" the display 200. FIG. 10 shows a partially "painted" display 200 with the pattern 910 denoting the remaining finger touch areas to be completed, and color 1005 filling the display 200 where finger touches had been registered with sufficient pressure. FIG. 11 shows one aspect of a display 200 that had been partially painted 1105, with a prompt 1115 asking the user whether they have completed painting the defined grid area 910. FIG. 12 shows that if the user selected the option that they had completed the painting, and if the defined 910 had not been sufficiently completed to paint the necessary areas (partially shown in 1205), then a prompt 1215 is presented allowing the user to start over or to finish touching the defined grid areas. FIG. 13 then shows one embodiment of information presented 1315 on the display 200, indicating that a crack has been detected.

While embodiments shown herein show a completely painted display as an exit criterion, various embodiments utilizing the magnetometer reading approach anticipate the possibility of painting just a portion of the display, painting no parts of the display, or halting the test as soon as a fault condition (e.g. a crack) is detected without painting or covering the entire display. Also, in various embodiments herein, once a crack condition is detected, the mobile device may be configured to prompt the user to take a photograph of the device in a mirror (with its own forward-facing camera) to document the state of a crack in the mobile devices' display.

Alternatively or in combination, the FSTA may present the prompts in a game-like manner, prompting the user, for instance, to press various sections of the screen to achieve a game objective, or to "wall in" an item moved across the display, thus prompting the user to touch the desired sections of the screen. Alternatively, the magnetometer reading embodiments may be used in combination with the pressure sensor approaches described above to improve accuracy or shorten the duration of the test to determine whether a crack is present in the display.

Returning to FIG. 7, the FSTA monitors the progress of the user in completing the test, and if necessary, prompts the user 730 to complete or end the test. Once the test is complete, the analysis 735 of the magnetometer data is conducted to determine whether a crack is likely present in the display, and an appropriate test result is displayed 735 and/or transmitted to a central server 860 and/or to a third party, such as an insurance agency, a mobile network operator, a mobile device manufacturer, or to any entity for which fault states of the mobile device are of importance.

While the user is making the prompted presses as described above, the FSTA accumulates and stores magnetometer data for each of the touched zones in the defined touch areas (such as the grid 910) over time. In doing so, the FSTA can use predetermined methods to analyze anomalies in the accumulated magnetometer measurements that may indicate the presence of one or more a cracks in the display of the mobile device. For example, a deviation or change in magnetometer readings of more than a predefined percentage (for example, 5%, 10% or 50%) between two or more accumulated magnetometer readings may indicate a crack is present in the display. The FSTA may then take the appropriate action to report status to the user, and alternatively to the outside entity as mentioned above.

Pixel Test.

In one embodiment, a user interactively verifies that a crack exists in a screen of the mobile device by interacting with an application in the mobile device to indicate when one or more pixels are not illuminating correctly. To verify that the user is providing correct information, the application may provide information that requires negative responses as well as positive responses in order to correctly assess the state of the device. For example, in one embodiment, the screen could be partitioned or tessellated into regions, and the application could attempt to illuminate each screen section (with varying colors, if desired), and ask the user to press any sections that do not show evenly lit pixels within each respective section. The areas indicated by the user as having unevenly lit pixels could then be tessellated into smaller regions, and the interaction repeated until a suspect region is identified to a sufficiently small size. The application can then provide prompt such as "Please watch for a green pixel being displayed," and then asking the user to click when the user saw it. If no press occurs after a predetermined period of time, then the area is assumed to be nonfunctional. Further, to determine the veracity of the user's inputs, a pixel can be presented to a "known good" area of the screen (one that the user had previously indicated during the tessellation test was active and functional) and if the user does not press the response pad that they affirmatively saw the pixel, then the user's inputs can be judged to be suspect. This process may be used iteratively determine not only the veracity of the user's inputs, but could be used to map out to high accuracy the extent of any nonfunctional areas of the screen. This embodiment makes this possible by allowing the "edge" of known good areas to be determined where the user provides a response as seeing the illuminated pixels, and areas where no illumination was seen. Additional pixel verifications can be conducted to determine whether any faulty areas "move" with additional pixel tests with random (or slightly displaced) locations on the screen, thus assessing the veracity of the user's claim that an area of the display is faulty (e.g., cracks don't "move," although they may grow larger).

Thus, cracked areas, stuck or dead pixels, or faulty display interfaces can be mapped out and used to assess costs of mobile device repair/replacement, or to determine the applicability of an insurance claim, or for any other desired purpose. In one additional embodiment, a second mobile device is utilized with an FSTA installed upon it that synchronizes with the FSTA installed on the first suspect mobile device (such as through a Bluetooth pairing). In this scenario, the second mobile device's camera is used to photograph or video the display of the suspect mobile device to assess whether pixels (and/or regions) that are attempted to be displayed on the suspect mobile device are or are not visible; as such, a full test of the screen can be automated and a rapid determination made as to the areas of the screen/display that are or are not faulty without relying upon a user to provide the necessary (and accurate) inputs.

The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the invention. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present invention. These and other changes or modifications are intended to be included within the scope of the present invention, as expressed in the following claims.

What is claimed is:

1. A method for determining that a fault condition exists within a touch-sensitive display of a mobile device, comprising:
   prompting a user to touch two fingers to the display;
   prompting the user to drag a touched point across a displayed pattern with the two fingers;
   illuminating the display with a painted area where the user dragged the touched point to confirm areas touched by the user;
   measuring a plurality of pressure values measured from each touch zone of the two fingers from the user's contact from the touched point as it is dragged across the display; and
   determining from the plurality of pressure values whether a fault is found in the display of the mobile device by comparing the measured pressure values to a predetermined criterion.

2. The method of claim 1, further comprising formatting results of the determining step for transmission to a host server.

3. The method of claim 2, wherein the results comprise test results comprising the status of at least one fault state within the mobile device.

4. The method of claim 3, further comprising encrypting the test results prior to transmitting the test results to the host server.

5. The method of claim 1, further comprising: reporting results of the determination to a third party, wherein the third party includes at least one of: an owner of the mobile device, an insurance agency, a potential buyer, a transferee of the mobile device, a law enforcement agency, and a lost device recovery entity.

6. The method of claim 5, wherein the third party accesses a host server to determine whether a fault state exists within the mobile device, and wherein the fault state comprises test results from the mobile device.

7. A system comprising:
a mobile device, the device comprising:
    a processor in communication with a memory;
    a user interface in communication with the processor, the user interface including a touch-sensitive display and a data entry interface; and;
        a communications module in communication with the processor and configured to provide a communications interface to a host server, the host server further including a database;
wherein the memory of the mobile device includes instructions that when executed by the processor cause the mobile device to perform the steps of:
prompting a user to touch two fingers to the display;
prompting the user to drag a touched point across a displayed pattern with the two fingers;
illuminating the display with a painted area where the user dragged the touched point to confirm areas touched by the user;
measuring a plurality of pressure values measured from each touch zone of the two fingers from the user's contact from the touched point as it is dragged across the display; and
determining from the plurality of pressure values whether a fault is found in the display of the mobile device by comparing the measured pressure values to a predetermined criterion.

8. The system of claim 7, the steps further comprising formatting results of the determining step for transmission to the host server.

9. The system of claim 8, wherein the results comprise test results comprising the status of at least one fault state within the mobile device.

10. The system of claim 8, the steps further comprising encrypting the test results prior to transmitting the test results to the host server.

11. The system of claim 7, the steps further comprising: reporting results of the determination to a third party, wherein the third party includes at least one of: an owner of the mobile device, an insurance agency, a potential buyer, a transferee of the mobile device, a law enforcement agency, and a lost device recovery entity.

12. The system of claim 11, wherein the third party accesses the host server to determine whether a fault state exists within the mobile device, and wherein the fault state comprises test results from the mobile device.

* * * * *